US011787711B2

(12) United States Patent
Kang et al.

(10) Patent No.: US 11,787,711 B2
(45) Date of Patent: Oct. 17, 2023

(54) DEIONIZATION ELECTRODE, APPARATUS AND METHOD FOR DEIONIZATION ELECTRODE, ELECTRODE MODULE AND DEIONIZATION MODULE

(71) Applicant: SIONTECH CO., LTD., Daejeon (KR)

(72) Inventors: Kyung Seok Kang, Daejeon (KR); Kyung Han Lee, Daejeon (KR); Nam Soo Park, Daejeon (KR); Hyun Woo Yoo, Daejeon (KR); Bo Hyung Ryoo, Daejeon (KR)

(73) Assignee: SIONTECH CO., LTD., Daejeon (KR)

( * ) Notice: Subject to any disclaimer, the term of this patent is extended or adjusted under 35 U.S.C. 154(b) by 687 days.

(21) Appl. No.: 16/635,063

(22) PCT Filed: Jan. 28, 2020

(86) PCT No.: PCT/KR2020/001239
§ 371 (c)(1),
(2) Date: Mar. 10, 2020

(87) PCT Pub. No.: WO2021/149855
PCT Pub. Date: Jul. 29, 2021

(65) Prior Publication Data
US 2021/0221711 A1   Jul. 22, 2021

(30) Foreign Application Priority Data
Jan. 21, 2020   (KR) ........................ 10-2020-0008104

(51) Int. Cl.
*C02F 1/469*   (2023.01)

(52) U.S. Cl.
CPC ........ *C02F 1/4691* (2013.01); *C02F 2201/46* (2013.01)

(58) Field of Classification Search
CPC ..................................................... C02F 1/4691
See application file for complete search history.

(56) References Cited

U.S. PATENT DOCUMENTS

| 6,709,560 B2 * | 3/2004 | Andelman | ............ C02F 1/4691 |
| | | | 205/636 |
| 2019/0308893 A1 * | 10/2019 | Choi | ....................... C02F 1/001 |

FOREIGN PATENT DOCUMENTS

| KR | 10-1207463 B1 | 12/2012 |
| KR | 10-1237258 B1 | 2/2013 |
| KR | 20190063067 A * | 6/2019 |

OTHER PUBLICATIONS

Translation of EP 3279152 published on Aug. 2019 (Year: 2019).*

* cited by examiner

*Primary Examiner* — Salil Jain
(74) *Attorney, Agent, or Firm* — NKL LAW; Jae Youn Kim

(57) ABSTRACT

Disclosed are a deionization electrode having ion adsorption layers and ion selective membranes formed at opposite ends thereof, an electrode module configured such that deionization electrodes are stacked, and a deionization unit having electrode modules received therein to separate ions from water. The deionization electrode includes a current collector configured to have a circular flat structure, the current collector having a first hole formed therein, a first porous adsorption layer located on one surface of the current collector, the first adsorption layer being configured to have a flat structure, a second porous adsorption layer located on the other surface of the current collector, the second adsorption layer being configured to have a flat structure, a first ion selective membrane located on the surface of the first adsorption layer, and a second ion selective membrane located on the surface of the second adsorption layer.

1 Claim, 5 Drawing Sheets

DEIONIZATION ELECTRODE, APPARATUS AND METHOD FOR DEIONIZATION ELECTRODE, ELECTRODE MODULE AND DEIONIZATION MODULE

BACKGROUND OF THE INVENTION

Field of the Invention

The present invention relates to a deionization electrode having ion adsorption layers and ion selective membranes formed at opposite ends thereof, an electrode module configured such that deionization electrodes are stacked, and a deionization unit having electrode modules received therein to separate ions from water. In addition, the present invention relates to a method of producing the deionization electrode.

Description of the Related Art

Patent Document 001 discloses a method of manufacturing a capacitive deionization electrode including (a) a step of preparing a graphene solution, (b) a step of coating a graphite sheet with the graphene solution or mixing graphene powder with the graphene solution to prepare a sheet in order to manufacture a current collector precursor, (c) a step of reducing the current collector precursor in order to manufacture a current collector configured in the form of a graphene coating layer (film) or in the form of a graphene-graphite composite sheet, (d) a step of applying, to the current collector, or calendaring any one of a first composition including one or more selected from among ionic or non-ionic polymer resins or a graphene solution and electrode activating materials and a second composition including one or more selected from among ionic or non-ionic polymer resins and electrode activating materials coated with a graphene solution and then subjected to reduction in order to manufacture an active layer, and (e) a step of coating the surface of the active layer with an ion-selective binder solution including a crosslinkable ion-selective binder resin, a crosslinking agent, and a monomer and crosslinking the surface of the active layer to form an ion-selective coating layer.

Patent Document 002 discloses a CDI module and a method of manufacturing the same, wherein the method is a method of manufacturing an ion-selective capacitive deionization electrode, including (a) a step of manufacturing a first composition including one or more resins selected from among ion exchange resins, crosslinkable ion exchange resins, or non-ionic resins and electrode activating materials, (b) a step of applying the first composition to a current collector or calendaring the first composition to manufacture an active layer, and (c) a step of coating the surface of the active layer with an ion-selective polymer matrix solution including a crosslinkable ion exchange resin, a crosslinking agent, a monomer, and an initiator and crosslinking the surface of the active layer and wherein the CDI module is configured such that ion-selective capacitive deionization electrodes and spacers are disposed in a case having an inlet and an outlet for water containing dissolved ions in the state in which the ion-selective capacitive deionization electrodes and the spacers are alternately stacked.

PRIOR DOCUMENT

Patent Document (Patent Document 001) KR 10-1207463 B1 (Registration Date: Nov. 27, 2012)

(Patent Document 002) KR 10-1237258 B1 (Registration Date: Feb. 20, 2013)

SUMMARY OF THE INVENTION

The present invention has been made in view of the above problems, and it is an object of the present invention to provide a deionization electrode having ion adsorption layers and ion selective membranes formed at opposite ends thereof, an electrode module configured such that deionization electrodes are stacked, and a deionization unit having electrode modules received therein to separate ions from water.

It is another object of the present invention to provide a method of producing the deionization electrode.

In accordance with an aspect of the present invention, the above and other objects can be accomplished by the provision of a capacitive deionization electrode including a current collector configured to have a circular flat structure, the current collector having a first hole formed therein, a first adsorption layer located on one surface of the current collector, the first adsorption layer being configured to have a flat structure, the first adsorption layer being porous, a second adsorption layer located on the other surface of the current collector, the second adsorption layer being configured to have a flat structure, the second adsorption layer being porous, a first ion selective membrane located on the surface of the first adsorption layer, and a second ion selective membrane located on the surface of the second adsorption layer.

In accordance with another aspect of the present invention, there is provided a method of manufacturing a capacitive deionization electrode, the method including supplying a graphite sheet (a first supply step), attaching a first adsorption layer to one surface of the graphite sheet and a second adsorption layer to the other surface of the graphite sheet after the first supply step (an adsorption layer attachment step), and attaching an ion selective membrane to the surface of each of the first adsorption layer and the second adsorption layer after the adsorption layer attachment step (an ion selective membrane attachment step).

In accordance with another aspect of the present invention, there is provided a capacitive electrode module including a plurality of stacked deionization electrodes, and a spacer configured to define a flow path between neighboring ones of the deionization electrodes.

In accordance with a further aspect of the present invention, there is provided a deionization unit including a cylindrical container body, a first cover formed at one end of the body, the first cover having an introduction port formed therein, a second cover formed at the other end of the body, the second cover having a discharge port formed therein, electrode modules disposed in the container body in series, and a power supply terminal extending through the first cover and/or the second cover so as to protrude, the power supply terminal being configured to supply power to the electrode modules.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1A:
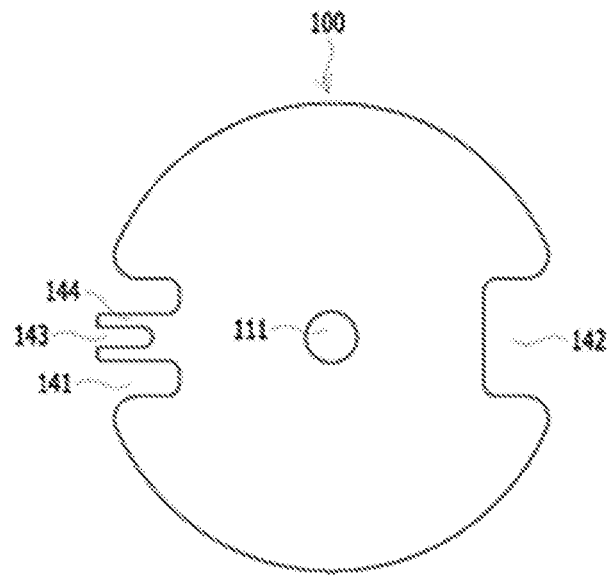
FIGS. 1(a)-1(b) are plan views of a capacitive deionization electrode according to the present invention.

Hereinafter, the most preferred embodiments of the present invention will be described in detail with reference to the accompanying drawings such that the present invention can be easily embodied by a person having ordinary skill in the art to which the present invention pertains.

Numbers cited in the following embodiments are not limited only to the cited targets, and may be applied to all embodiments. Targets that exhibit the same objects and effects as the constructions presented in the embodiments correspond to equivalent substitution targets. Superordinate concepts presented in the embodiments include subordinate concept targets that are not described.

Embodiment 1-1

The present invention relates to a capacitive deionization electrode 100 including a current collector 110 configured to have a circular flat structure, the current collector having a first hole 111 formed therein, a first adsorption layer 121 located on one surface of the current collector, the first adsorption layer being configured to have a flat structure, the first adsorption layer being porous, a second adsorption layer 131 located on the other surface of the current collector, the second adsorption layer being configured to have a flat structure, the second adsorption layer being porous, a first ion selective membrane 122 located on the surface of the first adsorption layer, and a second ion selective membrane 132 located on the surface of the second adsorption layer.

Embodiment 1-2

The present invention relates to a capacitive deionization electrode 100 configured such that the current collector is formed of graphite in Embodiment 1-1.

Embodiment 1-3

The present invention relates to a capacitive deionization electrode 100 configured such that each of the first adsorption layer and the second adsorption layer is formed of activated carbon in Embodiment 1-1.

Embodiment 1-4

The present invention relates to a capacitive deionization electrode 100 configured such that the first ion selective membrane and the second ion selective membrane have different polarities in Embodiment 1-1.

Embodiment 1-5

The present invention relates to a capacitive deionization electrode 100 configured such that the first ion selective membrane and the second ion selective membrane have the same polarity in Embodiment 1-1.

Embodiment 1-6

The present invention relates to a capacitive deionization electrode 100 further including a first recess 141 and a second recess 142 formed in opposite edges thereof in a symmetrical fashion and an electrode tip 144 formed in the first recess so as to protrude therefrom, the electrode tip having the shape of a protrusion, the electrode tip having an open second hole 143 formed therein, in addition to Embodiment 1-5.

Figure 1B:
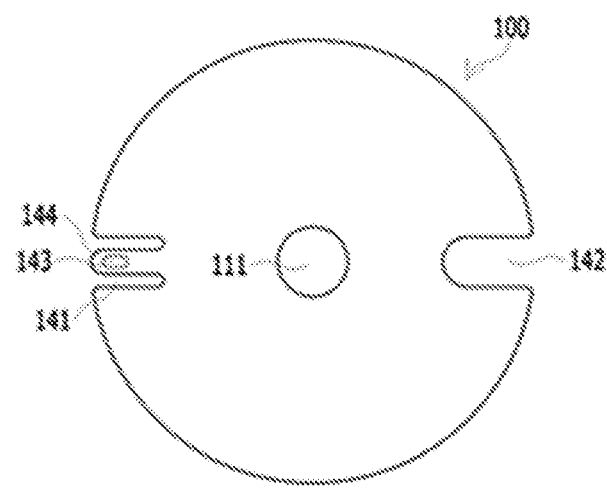
Figure 2:
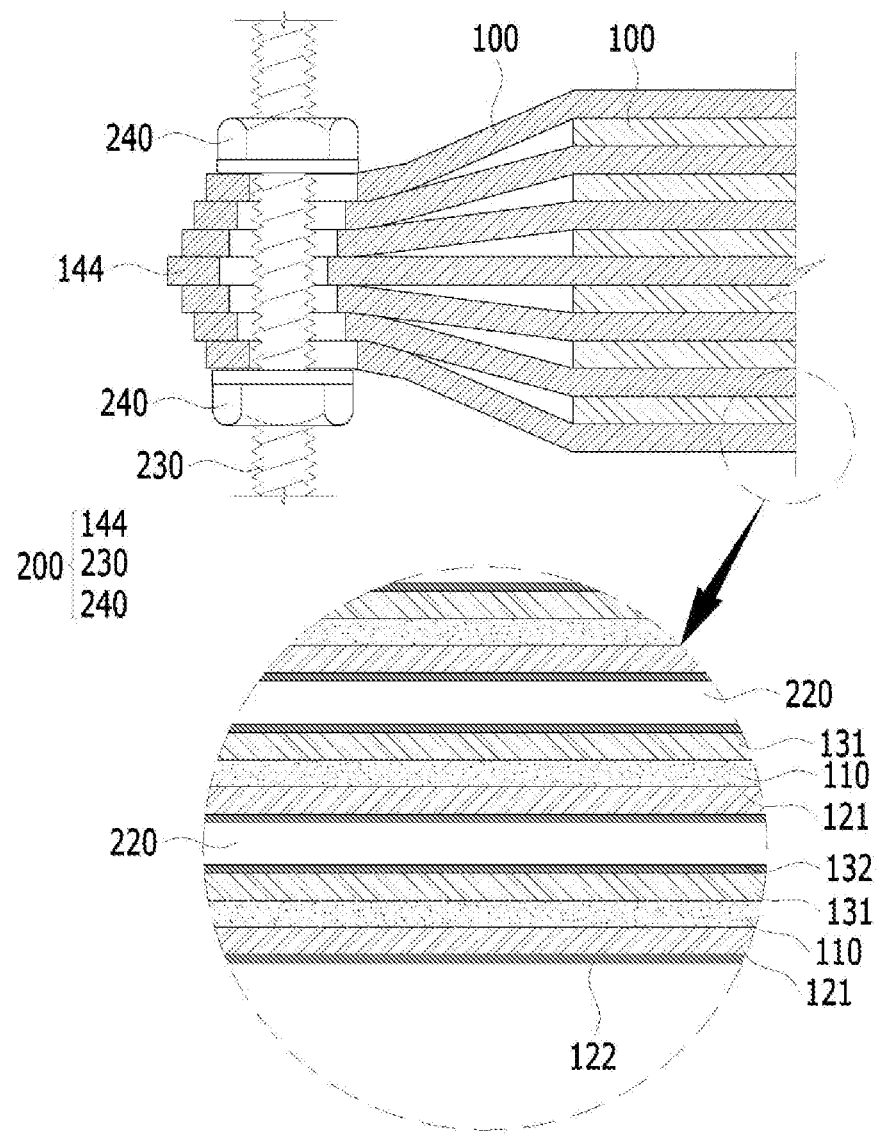
FIG. 2 is a sectional view of an electrode module including a combination of capacitive deionization electrodes according to the present invention.

The present invention (Embodiments 1-1 to 1-6; see FIGS. 1 and 2) relates to a capacitive deionization electrode. Main components of the capacitive deionization electrode include a current collector, a first adsorption layer, a second adsorption layer, a first ion selective membrane, and a second ion selective membrane. The coupling relationship of the main components is as follows. The current collector is located at the central part of the capacitive deionization electrode so as to have a flat structure, and the first adsorption layer and the second adsorption layer, each of which has a uniform thickness, are attached to opposite surfaces of the current collector. The first ion selective membrane and the second ion selective membrane are attached to the first adsorption layer and the second adsorption layer, respectively. Direct-current power is supplied to the current collector. The first adsorption layer and the second adsorption layer absorb some ions, and penetration of the remaining ions is blocked by the ion selective membranes. Whether penetration of the selected ions is possible may be determined depending on the polarities of the ion selective membranes. The current collector is formed of graphite, which is used to improve current delivery and corrosion resistance. Each of the first and second adsorption layers is formed of activated carbon including a mixture of carbon powder and a binder. In the case in which the first ion selective membrane and the second ion selective membrane have different polarities, the deionization electrode is used in a bipolar mode. In the case in which the first ion selective membrane and the second ion selective membrane have the same polarity, the deionization electrode is used in a monopolar mode. In the bipolar mode, the deionization electrode is formed as a disc. In the monopolar mode, the deionization electrode is formed as a disc, wherein a first recess and a second recess are formed in opposite ends of the disc on the basis of a center line thereof. An electrode tip, which is a protruding protrusion, is formed in the first recess, and the electrode tip is used for the supply of current. The electrode tip has a hole for coupling with a conducting rod for the supply of current. The hole is configured in the form of a slot, and the slot is formed so as to extend toward the center of the disc.

Embodiment 2-1

The present invention relates to a method of manufacturing a capacitive deionization electrode, the method including a first supply step (S100) of supplying a graphite sheet, an adsorption layer attachment step (S300) of attaching a first adsorption layer to one surface of the graphite sheet and a second adsorption layer to the other surface of the graphite sheet after the first supply step, and an ion selective membrane attachment step (S500) of attaching an ion selective membrane to the surface of each of the first adsorption layer and the second adsorption layer after the adsorption layer attachment step.

Embodiment 2-2

The present invention relates to a method of manufacturing a capacitive deionization electrode, wherein the adsorption layer attachment step includes simultaneously or sequentially attaching the first adsorption layer and the second adsorption layer in Embodiment 2-1.

Embodiment 2-3

The present invention relates to a method of manufacturing a capacitive deionization electrode, wherein the ion selective membrane attachment step includes simultaneously or sequentially attaching a first ion selective membrane and a second ion selective membrane in Embodiment 2-1.

Embodiment 2-4

The present invention relates to a method of manufacturing a capacitive deionization electrode, wherein the method further includes a size sorting step (S210) of uniformly sorting the size of carbon powder, an adsorption material supply step (S220) of supplying a fixed amount of a binder and carbon powder to a stirrer, and an adsorption material stirring step (S230) of stirring the carbon powder and the binder using the stirrer, before the adsorption layer attachment step, in addition to Embodiment 2-1.

Embodiment 2-5

The present invention relates to a method of manufacturing a capacitive deionization electrode, wherein the method further includes an adsorption layer thickness control step (S320) of equalizing the thickness of each of the adsorption layers, after the adsorption layer attachment step, in addition to Embodiment 2-1.

Embodiment 2-6

The present invention relates to a method of manufacturing a capacitive deionization electrode, wherein the method further includes an adsorption layer drying step (S330) of drying the adsorption layers in a drying chamber, after the thickness control step, in addition to Embodiment 2-5.

Embodiment 2-7

The present invention relates to a method of manufacturing a capacitive deionization electrode, wherein the method further includes a cutting step (S600) of cutting the deionization electrode in the form of a sheet, after the ion selective membrane attachment step, in addition to Embodiment 2-1.

The present invention relates to a method of manufacturing a capacitive deionization electrode. The manufacturing method according to the present invention is configured for continuous automatic production, by which productivity may be improved. A graphite sheet exists in the state of being wound around a cylindrical reel, and is gradually unwound so as to be supplied in the form of a sheet. A first adsorption layer is formed on one surface of the supplied graphite sheet. The first adsorption layer is fixed to the one surface of the supplied graphite sheet, and then a second adsorption layer is formed on the other surface of the graphite sheet. The first adsorption layer and the second adsorption layer are dried in a drying chamber during a transferring process thereof such that the first adsorption layer and the second adsorption layer are attached to the graphite sheet. After the first adsorption layer and the second adsorption layer are attached to opposite surfaces of the graphite sheet, a first ion selective membrane is attached to the first adsorption layer, and a second ion selective membrane is attached to the second adsorption layer. The first and second ion selective membranes have different polarities or the same polarity depending on whether the electrode is a bipolar electrode or a monopolar electrode. Each of the first and second adsorption layers is manufactured using carbon powder. The carbon powder is configured in the form of a sheet, and is mixed with a binder such that the carbon powder can be easily attached to the graphite sheet. In addition, the binder forms pores during a drying process thereof. In order to improve adsorption efficiency of the adsorption layers, it is necessary to use a uniform size of carbon powder. To this end, a size sorting step is included. Since the size of the pores and adhesive force vary depending on a composition ratio of the carbon powder and the binder, it is necessary to supply the carbon powder and the binder at a uniform ratio. Consequently, an adsorption material supply step is required. In order to obtain the homogeneous effect of the deionization electrode, the thickness and density of each of the adsorption layers must be uniform, which is achieved in an adsorption layer thickness control step. In the adsorption layer thickness control step, the thickness of each of the adsorption layers is controlled by a roller. After the attachment of the ion selective membranes, a cutting step of cutting the deionization electrode in the form of a disc is included. In the cutting step, the deionization electrode may be cut through press machining using a cutter, or may be cut using a laser cutter.

Embodiment 3-1

The present invention relates to a capacitive electrode module 200 including a plurality of stacked deionization electrodes 100 according to Embodiment 1-1 and a spacer 220 configured to define a flow path between neighboring ones of the deionization electrodes.

Embodiment 3-2

The present invention relates to a capacitive electrode module 200 configured such that the electrode tip 144 of the deionization electrode according to Embodiment 1-6 is disposed at every second layer and such that electrode tips are coupled to each other via a single conducting rod 230 in the state of being in contact with each other in Embodiment 3-1.

Embodiment 3-3

The present invention relates to a capacitive electrode module 200 configured such that the conducting rod is inserted into the second hole, the electrode module further including a fixture for fixing the conducting rod and the electrode tip, in addition to Embodiment 3-2.

Embodiment 3-4

The present invention relates to a capacitive electrode module 200 configured such that a screw thread is formed in the outer circumferential surface of the conducting rod and such that the fixture is formed as a nut screw-engaged with the screw thread in Embodiment 3-3.

Embodiment 3-5

The present invention relates to a capacitive electrode module 200 configured such that the fixture, the conducting rod, and the electrode tip are covered with a coating layer 250 in Embodiment 3-3.

Embodiment 3-6

The present invention relates to a capacitive electrode module 200 configured such that the deionization electrodes are disposed so as to form 40 to 60 layers, preferably 50 layers, in Embodiment 3-1.

Embodiment 3-7

The present invention relates to a capacitive electrode module 200 further including a conductive plate 261 having the same shape and size as each of the deionization electrodes, the conductive plate being located at each of one surface and the other surface of the capacitive electrode module, in addition to Embodiment 3-1.

The present invention (Embodiments 3-1 to 3-6; see FIG. 2) relates to a capacitive electrode module. The capacitive electrode module is formed by stacking a plurality of deionization electrodes, one of which has been described above, and is configured in the form of a cylinder. A spacer is located between neighboring ones of the deionization electrodes, and the spacer serves as a flow path. That is, the spacer is a space in which water flows, and the water is separated from ions while flowing in the spacer.

A deionization electrode according to the present is configured in the form of a disc, and is provided in the central part thereof with a first hole. In a plurality of stacked deionization electrodes, first holes are aligned with each other. Water supplied through an introduction port flows in a container body in the circumferential direction thereof, passes through the spacers, and is collected in the first holes. The water collected in the first holes has already been separated from ions, and is discharged through a discharge port.

In a monopolar electrode module, ion selective membranes having the same polarity are formed at opposite ends of each deionization electrode, stacked deionization electrodes are disposed so as to face ion selective membranes having different polarities. In a bipolar electrode module, ion selective membranes having different polarities are formed at opposite ends of each deionization electrode, stacked deionization electrodes are disposed so as to face ion selective membranes having different polarities. At the time of applying potential, in the monopolar electrode module, potential is directly applied to each current collector, and potential different for each layer of the deionization electrodes is alternately applied. In contrast, in the bipolar electrode module, conductive plates are located at opposite sides of a plurality of stacked deionization electrodes, and the conductive plates apply potentials having different polarities. In the monopolar electrode module, potentials having different polarities are applied to the current collectors of the plurality of stacked deionization electrodes using two conducting rods. The two conducting rods are inserted into opposite ends of the stacked deionization electrodes in a symmetrical fashion, and the inserted conducting rods alternately contact the deionization electrodes. That is, different potentials may be alternately applied to the stacked deionization electrodes. A monopolar deionization electrode has a first recess and a second recess formed in the diagonal direction thereof, and an electrode tip protrudes from the first recess. A second hole is formed in the electrode tip. That is, a first recess of a first-layer deionization electrode and a second recess of a second-layer deionization electrode face each other, which is repeated. A conducting rod is inserted through the second hole formed in the electrode tip of the first recess, and the conducting rod is fixed by a fixture.

Embodiment 4-1

The present invention relates to a deionization unit 300 including a cylindrical container body 310, a first cover 320 formed at one end of the body, the first cover 320 having an introduction port 321 formed therein, a second cover 330 formed at the other end of the body, the second cover 330 having a discharge port 331 formed therein, electrode modules 200 according to Embodiment 3-1 disposed in the container body in series, and a power supply terminal 430 extending through the first cover and/or the second cover so as to protrude, the power supply terminal being configured to supply power to the electrode modules.

Embodiment 4-2

The present invention relates to a deionization unit 300 configured such that a plurality of deionization units is coupled to each other in Embodiment 4-1.

Embodiment 4-3

The present invention relates to a deionization unit 300 configured such that deionization units are coupled to each other in series or in parallel in Embodiment 4-1.

Embodiment 4-4

The present invention relates to a deionization unit 300 configured such that the power supply terminal and the conducting rod are wired with each other in Embodiment 4-1.

Embodiment 4-5

The present invention relates to a deionization unit 300 configured such that the power supply terminal and the conductive plate are wired with each other in Embodiment 4-1.

Figure 3A:
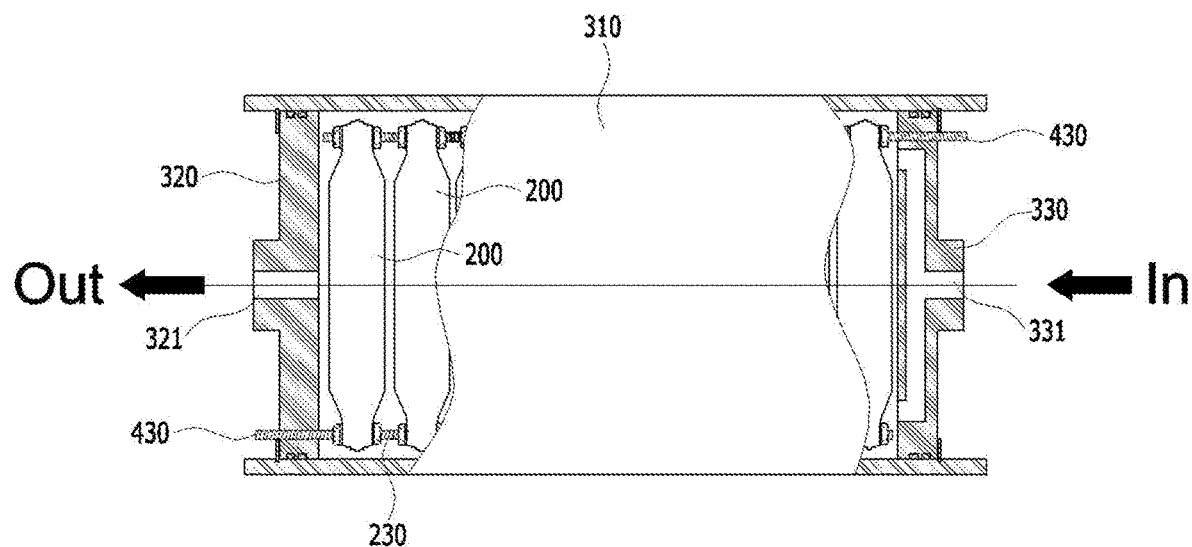
FIGS. 3(a)-3(b) are sectional views of a deionization unit having electrode modules received therein according to the present invention.
Figure 3B:
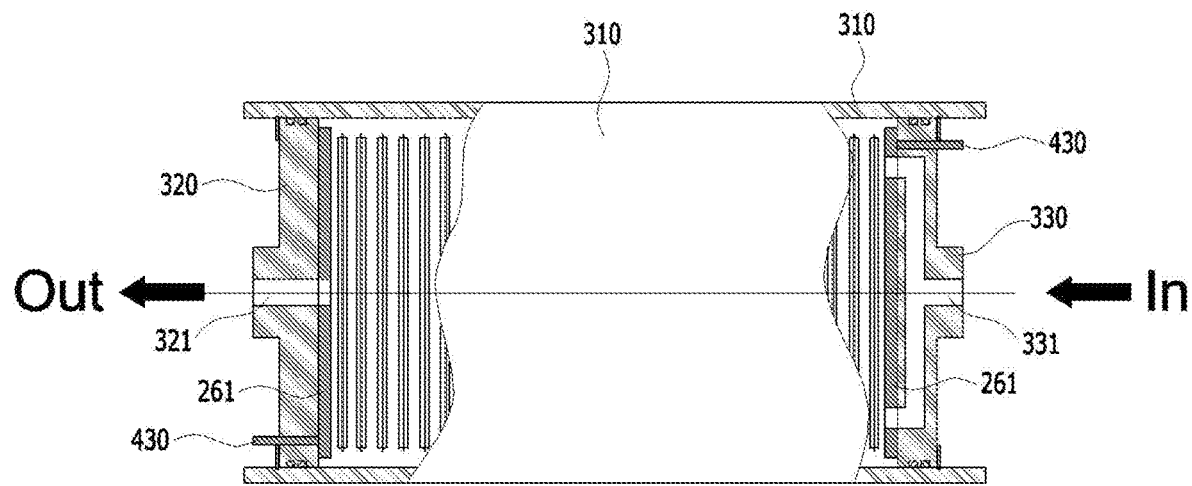
Figure 4:
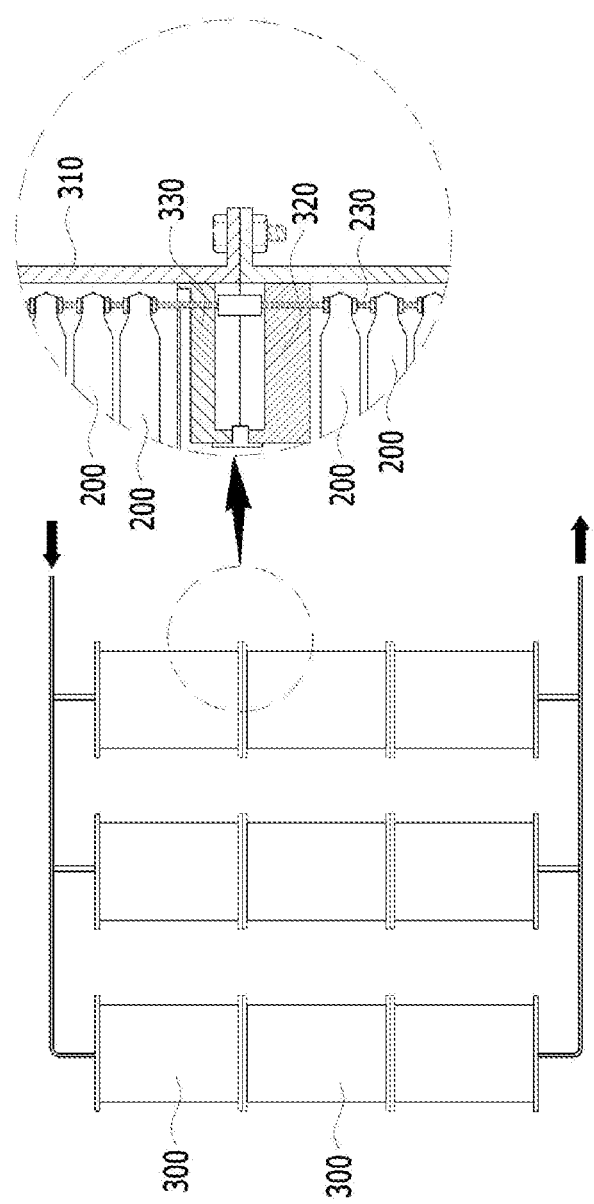
FIG. 4 is a detailed view of a deionization unit coupling portion according to the present invention.
Figure 5A:
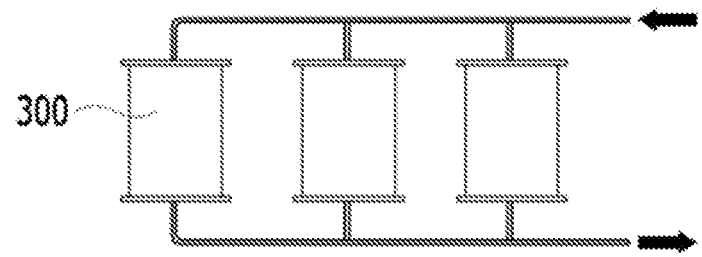
FIGS. 5(a)-5(c) are conceptual views of an embodiment in which deionization units according to the present invention are coupled to each other.
Figure 5B:
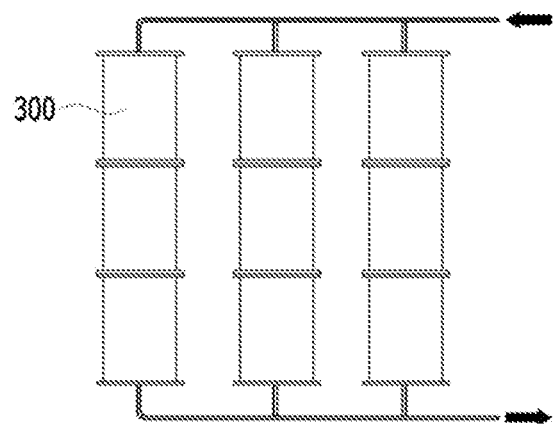
Figure 5C:
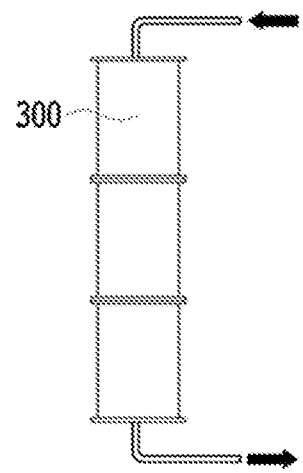

The present invention (Embodiments 4-1 to 4-5; see FIGS. 3, 4, and 5) relates to a deionization unit. The deionization unit is configured in the form of a hermetically sealed container. A plurality of electrode modules, one of which has been described above, is inserted into the container. The deionization unit includes a cylindrical container body, and a first cover and a second cover are coupled to opposite sides of the container body. A power supply terminal is located at each of the first cover and the second cover, and external direct-current power is supplied to the power supply terminal. The power is supplied to the electrode modules received in the container through the power supply terminal. In order to control the flow rate of clean water and to control water purification efficiency, a plurality of deionization units may be disposed in the state of being combined in series or in parallel. In the case in which the deionization units are disposed in series, two deionization units are coupled to each other in the state of being in contact with each other, and a discharge port of a second cover of a first deionization unit communicates with an introduction port of a first cover of a second deionization unit. That is, water purified by the first deionization unit is secondarily purified by the second deionization unit. A power supply terminal provided at one side of the container body supplies negative current, and a power supply terminal provided at the other side of the container body supplies positive current. In the case in which two container bodies are coupled to each other in series, the same current is formed at coupling portions thereof. In the case in which different currents are formed, short circuit may occur, which leads to damage to the power supply terminals and loss of energy.

Embodiment 4-6

The present invention relates to a deionization unit 300 further including a gap maintainer 350 having one side located at the inner periphery of the container body and the other side located at the outer periphery of the container body, in addition to Embodiment 4-1.

Embodiment 4-7

The present invention relates to a deionization unit 300 configured such that the gap maintainer is integrally formed with the container body or is separably coupled to the container body in Embodiment 4-6.

Embodiment 4-8

The present invention relates to a deionization unit 300 configured such that the gap maintainer includes a plurality of gap maintenance protrusions formed in the longitudinal direction of the container body in the state of being disposed at uniform intervals in Embodiment 4-7.

Embodiment 4-9

The present invention relates to a deionization unit 300 configured such that the gap maintainer is constituted by a cylindrical frame and is coupled to a gap between the container body and each of the electrode modules in a fitting fashion in Embodiment 4-7.

The present invention (Embodiments 4-6 to 4-9) relates to the shape of a deionization unit and the disposition of electrode modules. The inner shape of a container body is cylindrical, and the outer shape of each of the electrode modules is cylindrical. That is, the electrode modules are inserted into the container body, and a gap is formed between the outer periphery of each of the electrode modules and the inner periphery of the container body. The gap is a space in which water discharged through the electrode modules is collected, and the collected water must be discharged outside through a second cover. The space is minimized in order to prevent accumulation of water, and a gap maintainer is inserted into the space in order to prevent the water from being collected in a biased state. The gap maintainer may be formed in the container body so as to have the shape of a protrusion while being integrally formed with the container body, or may be configured in the form of a frame, which may be coupled to a gap between the container body and each of the electrode modules in a fitting fashion.

As is apparent from the above description, the present invention has an effect in that direct current is supplied to a current collector or a conductive plate and in that dissolved ions are selectively separated from water by adsorption layers and ion selective membranes.

The present invention has an effect in that a first adsorption layer and a second adsorption layer are formed respectively on one surface and the other surface of a graphite sheet supplied from a drum, and then ion selective membranes are formed, which is automatically performed through a continuous process, whereby it is possible to improve productivity.

The present invention has an effect in that a deionization electrode is configured in the form of a disc, wherein two symmetrical recesses are formed in the disc, an electrode tip is formed at only one of the symmetrical recesses, whereby a conducting rod does not protrude out of the disc at the time of production of a monopolar deionization electrode.

The present invention has an effect in that it is possible to combine a plurality of deionization units in series or in parallel, whereby it is possible to easily adjust the quantity of production of the deionization units as needed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A deionization unit comprising:
    a cylindrical container body;
    a first cover formed at one end of the cylindrical container body, the first cover having an introduction port formed therein;
    a second cover formed at the other end of the cylindrical container body, the second cover having a discharge port formed therein;
    electrode modules disposed in the cylindrical container body in series; and
    a power supply terminal extending through the first cover and/or the second cover so as to protrude, the power supply terminal being configured to supply power to the electrode modules,
    wherein at least one of the electrode modules is a capacitive electrode module comprising:
    a plurality of stacked deionization electrodes; and
    a spacer configured to define a flow path between neighboring ones of the plurality of the stacked deionization electrodes,
    wherein at least one of the plurality of the stacked deionization electrodes is a capacitive deionization electrode comprising:
    a current collector configured to have a circular flat structure, the current collector having a first hole formed therein;
    a first adsorption layer located on one surface of the current collector, the first adsorption layer being configured to have a flat structure, the first adsorption layer being porous;
    a second adsorption layer located on the other surface of the current collector, the second adsorption layer being configured to have a flat structure, the second adsorption layer being porous;
    a first ion selective membrane located on a surface of the first adsorption layer; and
    a second ion selective membrane located on a surface of the second adsorption layer, wherein a first recess and a second recess are symmetrically formed in opposite edges of the capacitive deionization electrode, an electrode tip having a shape of a protrusion is formed and protrudes from the first recess, and a second hole is formed in the electrode tip, wherein the first adsorption layer and the second adsorption layer are made of an activated carbon powder, and the activated carbon powder has a uniform size, and wherein a thickness of each of the first adsorption layer and the second adsorption layer is equalized.

* * * * *